United States Patent
Köser (10) Patent No.: US 9,699,488 B2
(45) Date of Patent: Jul. 4, 2017

(54) SMART SNAP TO INTERESTING POINTS IN MEDIA CONTENT

(71) Applicant: Google Inc., Mountain View, CA (US)

(72) Inventor: Mikkel Crone Köser, Vanløse (DK)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 14/293,565

(22) Filed: Jun. 2, 2014

(65) Prior Publication Data

US 2015/0350735 A1    Dec. 3, 2015

(51) Int. Cl.
| | |
|---|---|
| *H04N 21/472* | (2011.01) |
| *H04N 21/6587* | (2011.01) |
| *H04N 21/845* | (2011.01) |
| *H04N 21/2743* | (2011.01) |
| *H04N 21/235* | (2011.01) |
| *H04N 21/435* | (2011.01) |

(52) U.S. Cl.
CPC ....... *H04N 21/2353* (2013.01); *H04N 21/235* (2013.01); *H04N 21/2743* (2013.01); *H04N 21/435* (2013.01); *H04N 21/47217* (2013.01); *H04N 21/6587* (2013.01); *H04N 21/8455* (2013.01)

(58) Field of Classification Search
CPC ......... H04N 21/47217; H04N 21/6587; H04N 21/8455; H04N 21/2743; H04N 21/235; H04N 21/435; H04N 21/2353
See application file for complete search history.

(56) References Cited

U.S. PATENT DOCUMENTS

| | | | |
|---|---|---|---|
| 861,462 A | 7/1907 | Hawk | |
| 5,828,370 A * | 10/1998 | Moeller et al. | ............... 715/720 |
| 5,884,056 A * | 3/1999 | Steele | ............. 715/738 |
| 6,118,923 A * | 9/2000 | Rodriguez | ..................... 386/241 |
| 6,249,281 B1 * | 6/2001 | Chen et al. | .................... 715/753 |
| 6,597,375 B1 * | 7/2003 | Yawitz | ................. G11B 27/034 |
| | | | 715/723 |
| 7,934,166 B1 | 4/2011 | Clark | |
| 8,151,179 B1 * | 4/2012 | Raman et al. | ................. 715/203 |
| 8,438,595 B1 * | 5/2013 | Kannan | ............... G11B 27/322 |
| | | | 725/32 |
| 8,762,844 B2 * | 6/2014 | Kim | ...................... G11B 27/34 |
| | | | 715/716 |
| 8,984,405 B1 * | 3/2015 | Geller et al. | .................. 715/719 |
| 9,066,145 B2 * | 6/2015 | Kilar | |
| 9,104,440 B2 * | 8/2015 | Jarrett | ................. G06F 3/04883 |
| 9,411,422 B1 * | 8/2016 | McClendon | ............ G06F 3/016 |

(Continued)

*Primary Examiner* — Daniel Walsh
(74) *Attorney, Agent, or Firm* — Morris and Kamlay LLP (57) ABSTRACT

Systems and techniques are provided for smart snap to interesting points in media content. A position control input may be received from a user to a control interface for a content player being used with a content item. A smart snap point and an associated smart snap area t may be determined for the content item based on the received position control input. The smart snap point and the associated smart snap area may be stored. A second position control input to the control interface for the content player being used with the content item may be received. The position control input may be determined to move a position indicator into the associated smart snap area for the smart snap point. Use of the content item may be resumed with the content player from the smart snap point.

24 Claims, 6 Drawing Sheets

(56) References Cited

U.S. PATENT DOCUMENTS

| | | | |
|---|---|---|---|
| 2002/0112226 A1* | 8/2002 | Brodersen et al. | 717/140 |
| 2002/0186252 A1* | 12/2002 | Himmel | G06F 3/04855 715/787 |
| 2004/0090466 A1* | 5/2004 | Loveria, III | G09G 5/14 715/781 |
| 2004/0189691 A1* | 9/2004 | Jojic | G06F 17/30825 715/720 |
| 2005/0069283 A1* | 3/2005 | Mitsuyu | 386/46 |
| 2005/0185823 A1* | 8/2005 | Brown et al. | 382/103 |
| 2006/0161950 A1* | 7/2006 | Imai | H04N 5/445 725/46 |
| 2007/0014404 A1* | 1/2007 | Cha | H04N 5/445 380/201 |
| 2007/0050827 A1* | 3/2007 | Gibbon et al. | 725/88 |
| 2007/0168413 A1* | 7/2007 | Barletta | G06F 3/04883 709/203 |
| 2007/0245243 A1* | 10/2007 | Lanza et al. | 715/723 |
| 2008/0040770 A1* | 2/2008 | Angquist | G11B 27/034 725/135 |
| 2008/0089665 A1* | 4/2008 | Thambiratnam et al. | 386/95 |
| 2009/0172543 A1* | 7/2009 | Cronin et al. | 715/721 |
| 2010/0061709 A1* | 3/2010 | Agnihotri et al. | 386/124 |
| 2010/0086283 A1* | 4/2010 | Ramachandran | H04N 5/44591 386/241 |
| 2010/0145796 A1* | 6/2010 | Berry et al. | 705/14.49 |
| 2010/0251120 A1* | 9/2010 | Chelba | H04N 5/44591 715/719 |
| 2011/0041060 A1* | 2/2011 | Chien | G11B 27/34 715/716 |
| 2011/0074699 A1* | 3/2011 | Marr | G06F 3/0485 345/173 |
| 2011/0258547 A1* | 10/2011 | Symons et al. | 715/723 |
| 2011/0261258 A1* | 10/2011 | Ramachandran | H04N 5/44591 348/564 |
| 2012/0050012 A1 | 3/2012 | Alsina et al. | |
| 2012/0059946 A1* | 3/2012 | Wang | H04L 65/4084 709/231 |
| 2012/0148213 A1* | 6/2012 | Bamba | H04N 5/76 386/241 |
| 2012/0174005 A1* | 7/2012 | Deutsch | G06F 3/04817 715/764 |
| 2012/0216121 A1* | 8/2012 | Lin et al. | 715/721 |
| 2012/0237183 A1* | 9/2012 | Chen | H04N 7/17318 386/241 |
| 2013/0004138 A1* | 1/2013 | Kilar | H04N 21/4756 386/230 |
| 2013/0031479 A1* | 1/2013 | Flowers | G06F 8/00 715/716 |
| 2013/0055125 A1* | 2/2013 | Jackson | G06F 3/04845 715/769 |
| 2013/0111396 A1 | 5/2013 | Brid | |
| 2013/0166587 A1* | 6/2013 | Berry | G06F 17/30038 707/769 |
| 2013/0191746 A1* | 7/2013 | Huang | G06F 3/0484 715/716 |
| 2013/0263036 A1* | 10/2013 | Berenson et al. | 715/773 |
| 2013/0336638 A1* | 12/2013 | Fork et al. | 386/278 |
| 2014/0019902 A1* | 1/2014 | DeLuca | G06F 3/04855 715/772 |
| 2014/0029915 A1* | 1/2014 | Lin | H04N 5/91 386/241 |
| 2014/0033099 A1* | 1/2014 | Treitman | G06F 3/04855 715/768 |
| 2014/0082666 A1* | 3/2014 | Bloch | G11B 27/34 725/37 |
| 2014/0101550 A1* | 4/2014 | Zises | G06F 3/01 715/721 |
| 2014/0105577 A1* | 4/2014 | Wang | G08B 13/19671 386/241 |
| 2014/0161417 A1* | 6/2014 | Kurupacheril et al. | 386/241 |
| 2014/0169754 A1* | 6/2014 | Jarvinen et al. | 386/230 |
| 2014/0186010 A1* | 7/2014 | Guckenberger et al. | 386/248 |
| 2014/0189735 A1* | 7/2014 | Cudak | H04N 21/47217 725/38 |
| 2014/0229829 A1* | 8/2014 | Mazur | G11B 27/005 715/716 |
| 2014/0258854 A1* | 9/2014 | Li | G11B 27/34 715/702 |
| 2014/0281996 A1* | 9/2014 | Paulraj | G11B 27/11 715/720 |
| 2015/0074700 A1* | 3/2015 | Danovitz | H04N 21/4826 725/14 |
| 2015/0117834 A1* | 4/2015 | Cai | H04N 5/44513 386/230 |
| 2015/0128044 A1* | 5/2015 | Lee | H04N 5/2258 715/719 |
| 2015/0193061 A1* | 7/2015 | Stekkelpak | G06F 3/048 715/716 |
| 2015/0350735 A1* | 12/2015 | Koser | H04N 21/435 725/37 |
| 2016/0104513 A1* | 4/2016 | Bloch | G11B 27/34 715/720 |
| 2016/0247535 A1* | 8/2016 | Latulipe | G11B 27/002 |
| 2016/0277813 A1* | 9/2016 | Pizzo | H04N 21/8586 |

\* cited by examiner

SMART SNAP TO INTERESTING POINTS IN MEDIA CONTENT

BACKGROUND

Controls for viewing content, including media content such as videos, may be difficult to use on mobile touchscreen interfaces. It may be hard to hit the right point on the control, for example, due to the size of a user's fingers and low granularity of the controls. The mobile touchscreen may not be large enough to allow the controls to have large enough sizes to be manipulated precisely using fingers. A user who tries to use the scrub bar for a video on a mobile touchscreen interface to access a specific point in the video may often miss that point. The increments that the position indicator moves in on the scrub bar between each touching of the control bar may be too great, the user may only know the approximate place they are looking for, or the size of the control on the mobile touchscreen may make it difficult to accurately use the scrub bar to find a specific place in the video.

When watching episodes of a TV show, users may often want to skip past the introductory credits to the start of the episode. A user may attempt to use the scrub bar to go past the introductory credits, but may end up scrubbing past the start of the TV show due to the lack of accuracy in the mobile touchscreen interface. The user would then have to seek backwards or use the scrub bar to attempt to start playing the TV show from the desired point in the show. It may also be difficult for users to find points of interest in other video types, for example, video clips hosted on video streaming services. The user may wish to play an interesting point of the video, but may not know exactly when in the video the interesting point occurs. This may result in the user scrubbing back and forth in the video attempting to locate the interesting point. Comments, bookmarks and other markers may be embedded in videos to hint at places of interest, but must be placed manually by users or curators of the videos.

BRIEF SUMMARY

According to an embodiment of the disclosed subject matter, a position control input may be received. The position control input may be an input from a user to a control interface for a content player being used with a content item. A smart snap point may be determined for the content item based on the received position control input. An associated smart snap area may be determined for the smart snap point based on the received position control input. The smart snap point and the associated smart snap area may be stored.

A second position control input to the control interface for the content player being used with the content item may be received. It may be determined that the position control input moves a position indicator into the associated smart snap area for the smart snap point. Use of the content item may be resumed with the content player from the smart snap point. Resuming use of the content item may include automatically moving the position indicator to the smart snap point. The position control input may be received from a remote computing device. The position control input may include movement of a position indicator on a scrub bar. The position control input may include scrolling of a display of the content item. Determining the smart snap point may include creating a new smart snap point for the content item or modifying an existing smart snap point for the content item.

Storing the smart snap point and associated smart snap area may include storing the smart snap point and associated smart snap area with the content item or storing the smart snap point and associated smart snap area separately from the content item and linked to the content item. The smart snap point and the associated smart snap area may be displayed visually using the content player. The content item may include a video, an audio track, a web page, or an e-book. The smart snap point may include a time mark in the content item.

According to an embodiment of the disclosed subject matter, a means for receiving a position control input, where the position control input may be an input from a user to a control interface for a content player being used with a content item, a means for determining a smart snap point for the content item based on the received position control input, a means for determining an associated smart snap area for the smart snap point based on the received position control input, a means for storing the smart snap point and the associated smart snap area, a means for receiving a second position control input to the control interface for the content player being used with the content item, a means for determining that the position control input moves a position indicator into the associated smart snap area for the smart snap point, a means for resuming use of the content item with the content player from the smart snap point, a means for receiving a plurality of position control inputs from a plurality of computing devices, each computing device including a content player using a content item, a means for determining a smart snap point and an associated smart snap area for the content item based on the received plurality of position control inputs, a means for storing the smart snap point and the associated smart snap area, a means for sending the content item to a computing device, wherein the computing device is one of the plurality of computing devices or is an addition computing device, and a means for sending at least one of the at least one smart snap points and associated smart snap area to the computing device concurrently with the sending of the content item are included.

A means for receiving a content item for use with a content player, a means for receiving a smart snap point and an associated smart snap area for the content item, a means for using the content item with the content player, a means for receiving a position control input from a user to a control interface of the content player, a means for determining that the position control input moves a position indicator into the associated smart snap area for the content item; and a means for using the content item at the position indicated by the smart snap point are also included.

Systems and techniques disclosed herein may allow for smart snap to interesting points in media content. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Smart snap to interesting points in media content may allow users to quickly and accurately select points of interest in media content during consumption of the media content. Media content may include any media that can be consumed by a user using an appropriate computing device, including any audio, video, pictorial or textual content. The media content may be accessed with an application, such as a media player, that may include a control, such as a video scrub bar or scroll bar for a web page, allowing a user to access different sections of the content. For example, a user may use a scrub bar to advance to a point five minutes into a video and resume playing the video from there. Usage of the control when consuming a specific item of media content, or content item, such as a specific movie or web-hosted video, by an individual user or by a group of users may be analyzed to determine smart snap points for the item of media content. The smart snap points may be points in the content item that users consistently use the control to move to. The smart snap points may be stored with the content item, either as part of the data of the content item itself or separately and linked to the content item. Future users who consume the content item may use the control to move to a certain point in the content item. If the point is close to one of the media item's smart snap points, the control may be snapped to the smart snap point, as that may be assumed to be the point to which the user intended to move the control.

Content items may be consumed using players, which may be media players or viewers, which include controls allowing a user to move to various points in the content item. For example, a user watching a video may move to various points in the video using a scrub bar. The scrub bar may include a representation of the timeline of the video and an indicator that indicates the current position within the video being played back by the player. When playing the video on a smartphone with a touchscreen, the user may move to a different point of the video by selecting the indicator and dragging it to a different point on the scrub bar. The video may resume playing from the point in the video's timeline indicated by the point on the scrub bar to which the indicator was moved.

Smart snap points may be used in conjunction with a content item to allow for easier navigation within the content item using controls which may be difficult to use accurately. A smart snap point may be a marker for a point in a content item to which a control for consuming the content should snap when a position indicator is placed in proximity to the smart snap point. The required proximity of the position indicator to the smart snap point in order to be snapped to a smart snap point may be stored as a smart snap area included with the smart snap point. For example, a smart snap point may be a time code or marker in a video, such as three minutes, including a smart snap area of 2 minutes 45 second to 3 minutes 15 seconds. A user watching the video may place an indicator on a scrub bar for the video anywhere in the smart snap area, causing the position indicator to be moved to the smart snap point for the smart snap area. For example, the user may move the indicator to the 2 minutes 50 seconds position on the scrub bar. The indicator may be within the smart snap area for the smart snap point at three minutes, and may be moved to the smart snap point at three minutes. The video may resume playing from the three minute mark instead of the 2 minute 50 second mark where the user placed the indicator. The smart snap area may be set using measurements that are suitable to the media item. For example, videos and music and may have smart snap areas measured according to time, while web pages and e-books may have smart snap areas measured according to linear distance, paragraph or line numbers, html elements, or other suitable measurements for scrollable text and images.

The smart snap area may also be a heat map. For example, the smart snap area may include probabilities that an indicator placed at a specifics points by a user was meant to be placed on the smart snap point. The indicator may be moved to the smart snap point accordingly. For example, a smart snap point may be set at the three minute mark of a video. The smart snap area for the smart snap point may include a heat map, which may include a probability of 95% that an indicator placed between 2 minutes 50 second and 2 minutes 59 seconds was meant to be placed at the smart snap point, and a probability of 60% that an indicator placed 3 minutes 1 second and three minutes 10 seconds was meant to be placed at the smart snap point. An indicator placed just in front of the smart snap point may be more likely to be moved to the smart snap point than an indicator placed behind the smart snap point due to the heat map. The heat map may include any mixture of probabilities over various portions of the content item. For example, there may be a 95% probability that an indicator placed between 2 minutes 50 seconds and 2 minutes 54 seconds was meant to be placed at the 3 minute mark, but only a 45% probability that an indicator placed between 2 minutes 55 seconds and 2 minutes 59 seconds was meant to be placed at the 3 minute mark.

The smart snap area may be adjustable, for example, based on the size of the control. For example, the smart snap area for a smart snap point may be smaller when the control is larger, for example, because the content item is being viewed on a larger screen. The user may be more accurate with a larger control on a larger screen, allowing the smart snap area to be smaller, as the user may be able to place an indicator for the control closer to the smart snap point when the user intends to place the indicator on the smart snap point. A smaller screen, with a smaller control, may use a larger smart snap area, as the user may be less able to accurately place the indicator due to the control being smaller.

Various types of items of media content may include smart snap points. For example, any media that can be navigated linearly, such as videos, audio tracks, web pages, and electronic books (e-books) may include smart snap points for use with the appropriate player's control interface. A web browser may include a touch interface that does not have a separate visual element the user can touch to control the position within the web page. For example, the user may scroll by touching the screen and sliding up or down. The user may also be able to slide a finger on the screen and lift the finger off the screen to initiate momentum based scrolling. Momentum based scrolling may continue to scroll on a web page even when the user is no longer touching the touchscreen based, for example, on a mathematical model of momentum. Smart snap points may be used with such a control interface by causing a momentum scrolled web page that reaches a smart snap area while nearing or at the end of the scrolling to slow down or speed up so as to stop at or reach the smart snap point for the smart snap area. Smart snap points may also be used with media that may be navigated in any other number of dimensions, such as, for example, two-dimensional navigation of images which may be too large to view properly when shrunk to fit on a device's screen. The smart snap area may have the same number of dimensions as the content item.

The smart snap points for a content item may be determined based on how an individual user interacts with the content item. The smart snap points for the content item may be determined based on a single interaction from the user, or based on multiple interactions. For example, a user may watch a video recorded on a smartphone using the smartphone's media player as a player for the video. On viewing the video for the first time, the user may use a scrub bar to skip over approximately the first three minutes of the video and then have the media player resume playback of the video. This may be used to set a smart snap point at the point of the video where the user resumed playback, with a smart snap area of a size determined in any suitable manner. The user may view the video multiple time, and may attempt to skip to the same point in the video on every viewing. The user may be unable to use the scrub bar to have the media player resume playback at exactly three minutes each time, especially if no smart snap point has already been set, for example, due to the size of the controls and the nature of the smartphone's touchscreen interface. The indicator may be moved to a slightly different point on the scrub bar each time the user attempts to skip the first three minutes. The user may always have the media player resume playback around the three minute mark, for example, within 15 seconds of the three minute mark. The user's interactions with the video through user inputs to the control of the player may be analyzed to determine that a smart snap point should be set at the three minute mark of the video, with a smart snap area extending from 2 minutes 45 seconds to 3 minutes 15 seconds. The portion of the video that starts at the three minute mark may be of particular interest to the user. For example, action the user intended to film may not begin until the three minute mark of the video. Any suitable form of analysis may be used to determine where to locate the smart snap points and the size of the smart snap areas based on the inputs from the user.

Smart snap points for a content item may be determined based on interactions with the content item by a number of different users. For example, users may each watch the same video, which may be hosted on a server, using a streaming media application on a smartphone. A number of the users watching the video may use the scrub bar in their streaming media application to move approximately four minutes into the video before having the streaming media application resume playback. Different users may not have the streaming media application resume playback at the exact same point, as different users may place the indicator at slightly different points on the scrub bar when attempting to skip the first four minutes of the video. This may be due to, for example, the use of a touchscreen interface to move an indicator along the scrub bar, with different users having different sized fingers, different sized screens with different sized indicators, and differing abilities to accurately use a touchscreen interface. The users may always have the streaming media application resume playback of the video within 30 seconds of the four minute mark. The users' interactions with the video through the control of the streaming media application may be analyzed to determine that a smart snap point should be set at the four minute mark of the video, with a snap area extending from 3 minutes 30 to 4 minutes 30 seconds. The portion of the video that starts at the four minute mark may be considered interesting to a number of users.

Any suitable form of analysis may be used to determine where to locate the smart snap points and the size of the smart snap areas. For example, user interactions with a content item through a control interface may be subject to any form of statistical or machine learning based analysis. The analysis may attempt to determine the point in the content item that users intend to consume when the user navigates to a different point in the content item, for example, by the moving an indicator on a control or scrolling the content item. The user interactions from multiple users may be anonymized, with only the user interactions, and not any data about the user, being subject to analysis for determining the smart snap points and smart snap areas. The user interactions may also be analyzed based on the user, and based on the current user of the content item. For example, a user viewing a video may be presented with smart snap points and smart snap areas that have been determined based on weighting the user interactions from the viewing user's social network friends more heavily than the user interactions from other users, such that the smart snap points may correspond to points in the video that the viewing user's friends found interesting.

The smart snap points, and corresponding smart snap areas, for a content item may be stored with the content item in any suitable manner. For example, smart snap points for a video may be stored in the same file as the video, for example as metadata, or may be stored separately from the video, for example, if the file for the video is protected by Digital Rights Management (DRM) and cannot be modified to add the smart snap points.

A content item may have any number of smart snap points. For example, a video with a smart snap point at the three minute mark may also have another smart snap point at the six minute mark. Analysis of user interaction with the video may have resulted in the determination that users who watch the video attempt to skip from the beginning to the three minute mark, watch one minute of the video, and then attempt to skip to the six minute mark.

The smart snap points for a content item may be modifiable. For example, a video may have a smart snap point set at the 3 minute 10 second mark after a single user interaction, as the user may have used the scrub bar to place the indicator at the point of the video 3 minutes and 10 seconds in on first viewing the video. Further user interactions may cause the smart snap point to be moved to the three minute mark, as on subsequent viewings the user may place the indicator at points the cluster around the three minute mark, rather than around the 3 minute 10 second mark.

The number of smart snap points used with a content item may be adjusted based on the usage context for the content item. For example, a video may have 10 smart snap points set. When the video is viewed on a smartphone, all 10 smart snap points may be used in order to assist the user in navigating the video. When the video is viewed on a screen attached to a desktop computer, only 5 of the smart snap points may be used, as the user may be better able to control navigation of the video with the larger screen, and larger controls, and may not need as much assistance from the smart snap points to move to desired parts of the video.

A video editing application may use smart snap points for a video to assist a user in editing the video. For example, a user may record a video using their smartphone, and may edit the video using a video editing application on the smartphone or accessed through a server. The user may have previously viewed the video and used the control to move to different parts of the video, resulting in the video having several smart snap points. The video editing application may use the smart snap points for the video to suggest editing points for the video to the user. For example, a smart snap point may be set at the three minute mark of the video, as the user may have skipped the first three minutes of the video using the control, resulting in a smart snap point being set at the three minute mark.

Figure 1:
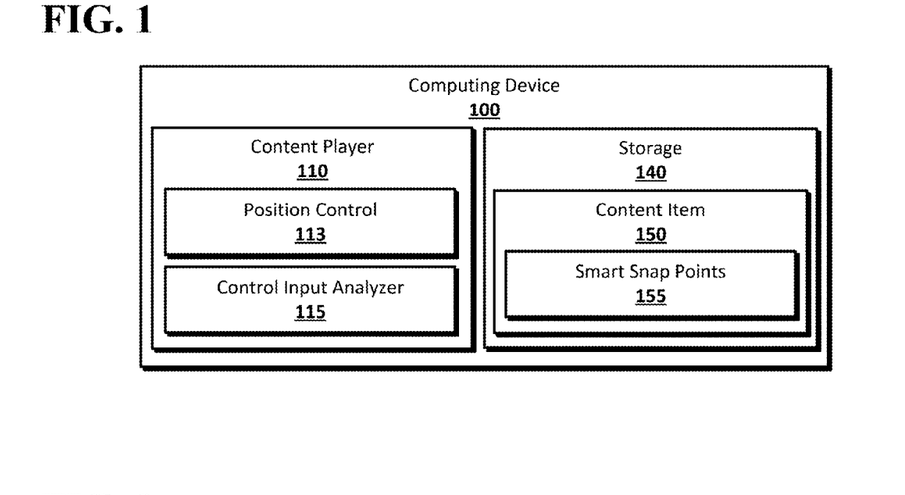
FIG. 1 shows an example system suitable for smart snap to interesting points in media content according to an implementation of the disclosed subject matter.

FIG. 1 shows an example system suitable for smart snap to interesting points in media content according to an implementation of the disclosed subject matter. A computing device 100 may include a content player 110 and storage 140. The computing device 100 may be any suitable device, such as, for example, a computer 20 as described in FIG. 8, for implementing the content player 110 and the storage 140. The computing device 100 may be a single computing device, or may include multiple connected computing devices, and may be, for example, a mobile computing device, such as a tablet, smartphone, or laptop, or other computing device, such as a desktop, smart television, or media streaming device. The content player 110 may be used to play or view the content item 150 from the storage 140. The content player 110 may include a position control 113 as part of a control interface, and a control input analyzer 115. The control input analyzer 115 may analyze inputs to the position control 113 to create the smart snap points 155 for the content item 150. The content item 150 and the smart snap points 155 may be stored in the storage 140 in any suitable manner.

The content player 110 may be any suitable application for playing back or viewing content items on the computing device 100, allowing a user to consume the content. For example, the content player 110 may be a video player, and audio player, an e-book reader or a web-browser, or an application capable of playing back or viewing multiple types of content. The content player 110 on the computing device 100 may also be a local interface for a content player hosted on a remote computing device, such as a server. The content item 150 may be of any suitable content type for use with the content player 110, and may be stored in the storage 140 of the computing device 100, or may be streamed to the content player 110 from a remote computing device. For example, the content item 150 may be a video, an audio track, an e-book, or a web page, and may be stored in the storage 140 until removed by the user or temporarily cached in the storage 140, or stored on and streamed from a remote computing device.

The content player 110 may include a control interface through which a user may interact with the content player 110. For example, the control interface for the content player 110 on a touchscreen device may include controls displayed on the screen that can be manipulated by the user using their fingers on the touchscreen. The control interface may also receive and interpret the inputs from a user to control the content player 110. The position control 113 may be part of the control interface that allows the user to control the position of playback or viewing of the content item 150 within the content player 110, and may include separate visual elements displayed to the user. For example, the position control 113 may include a scrub bar for a content item 150 that is a video or audio track. The position control 113 may also be the entire screen of a touchscreen device for a content item 150 that is a web page, as the entire screen may be used by the user to scroll the web page.

The control input analyzer 115 may be a component of the content player 110, or may be a separate component on the computing device 100 or on a remote computing device, that may analyze inputs to the position control 113 to create the smart snap points 155 for the content item 150. For example, when a user watches content item 150 that is a video using the content player 110, the control input analyzer 115 may analyze any inputs from the user to position control 113, which may be a scrub bar. By determining which parts of the video the user skips, and where in the video the position control 113 is used to skip to, the control input analyzer 115 may be able to determine where in the video a smart snap point should be created and the nature of the smart snap area for the smart snap point. The control input analyzer 115 may create and store the smart snap points 155 for the content item 150 in the storage 140, with the content item 150, or separately from the content item 150.

Figure 2:
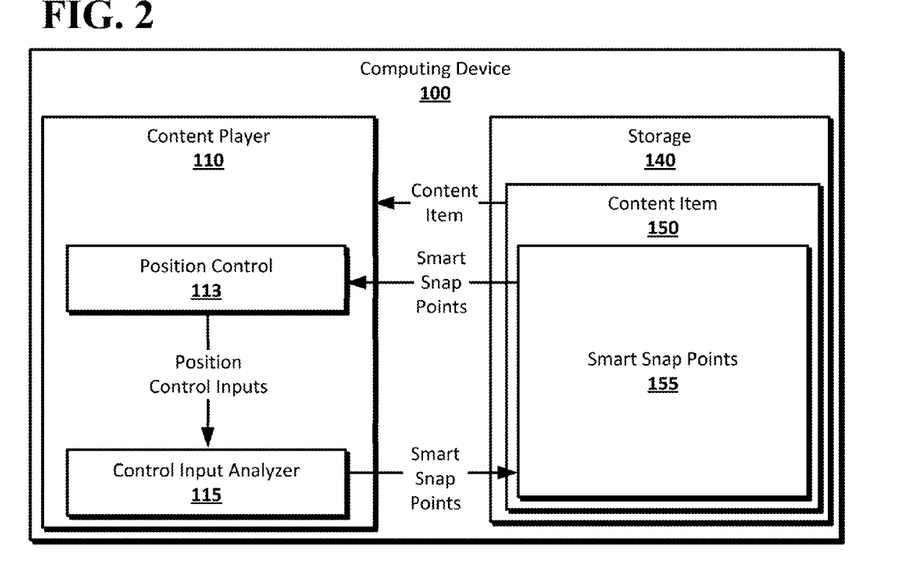
FIG. 2 shows an example arrangement for smart snap to interesting points in media content according to an implementation of the disclosed subject matter.

FIG. 2 shows an example arrangement for smart snap to interesting points in media content according to an implementation of the disclosed subject matter. The content player 110 on the computing device 100 may be used to play back or view the content item 150 from the storage 140. For example, the content player 110 may be a media player, and the content item 150 may be a video.

The content player 110 may also receive the smart snap points 155 for the content item 150, if any have been generated. The smart snap points 155 may be used by the position control 113 to determine when to adjust the playback or viewing position of the content item 150. For example, the user may use the touchscreen of a smartphone to manipulate the visual elements of the control interface for the position control 113, which may be, for example a scrub bar with a position indicator. The position control inputs from the user may be sent to the position control 113. The user may move the position indicator along the scrub bar, skipping over parts of the video to resume playback at a later time in the video, or going backwards to resume playback at an earlier time in the video. The position control 113 may compare the position the user moves the position indicator to on the scrub bar with the smart snap points 155 and included smart snap areas to determine whether the position indicator has been moved into a smart snap area. When the position control 113 determines that the position indicator has been moved into a smart snap area for one of the smart snap points 155, the position control 113 may automatically move, or snap, the position indicator to the appropriate smart snap point. Playback of the video may then resume from the smart snap point. The position control 113 may account for any suitable context when determining whether to adjust a playback or viewing position by, for example, moving the position indicator. For example, the position control 113 may use a heat map for a smart snap area, the direction a position indicator was moved, and the position a position indicator was moved from, when determining whether to resume playback or viewing of the content item 150 from a smart snap point when the user's input would cause playback or viewing to resume from a position within the smart snap point's smart snap area.

The control input analyzer 115 may receive position control inputs from the position control 113, and may analyze them to create and modify the smart snap points 155. For example, after using the content player 110 to begin playback of a content item 150 that is a video, the user may use the control interface to skip approximately the first three minutes of the video. The user may use the visual elements of the position control 113, such as a scrub bar, to adjust the playback position of the video, for example, moving a position indicator from the beginning of the scrub bar to a point on the scrub bar that corresponds approximately to the three minute mark of the video. These position control inputs from the user to the position control 113 may be used not only to adjust the playback position of the video, but to determine whether a smart snap point may be created and stored with or modified within the smart snap points 155.

For example, there may be no smart snap point in the smart snap points 155 for the content item 150 near the three minute mark of the video. The control input analyzer may use the position control inputs from the user to determine that such a smart snap point should be created and stored with the smart snap points 155. The control input analyzer 115 may also determine that there is already a smart snap point in the smart snap points 155 near, but not exactly at, the three minute mark of the video. The control input analyzer 115 may determine using any suitable analysis technique that, based on the position control inputs, the smart snap point should be moved exactly to the three minute mark of the video. Analysis techniques used by the control input analyzer 115 may include machine learning techniques and statistical evaluation techniques. The smart snap points 155 created by the control input analyzer 115 may be stored with the content item 150, for example, as part of the metadata for the content item 150. The smart snap points 155 may also be stored separately from the content item 150, for example, if DRM prevents modification of the file that includes the content item 150.

Figure 3:
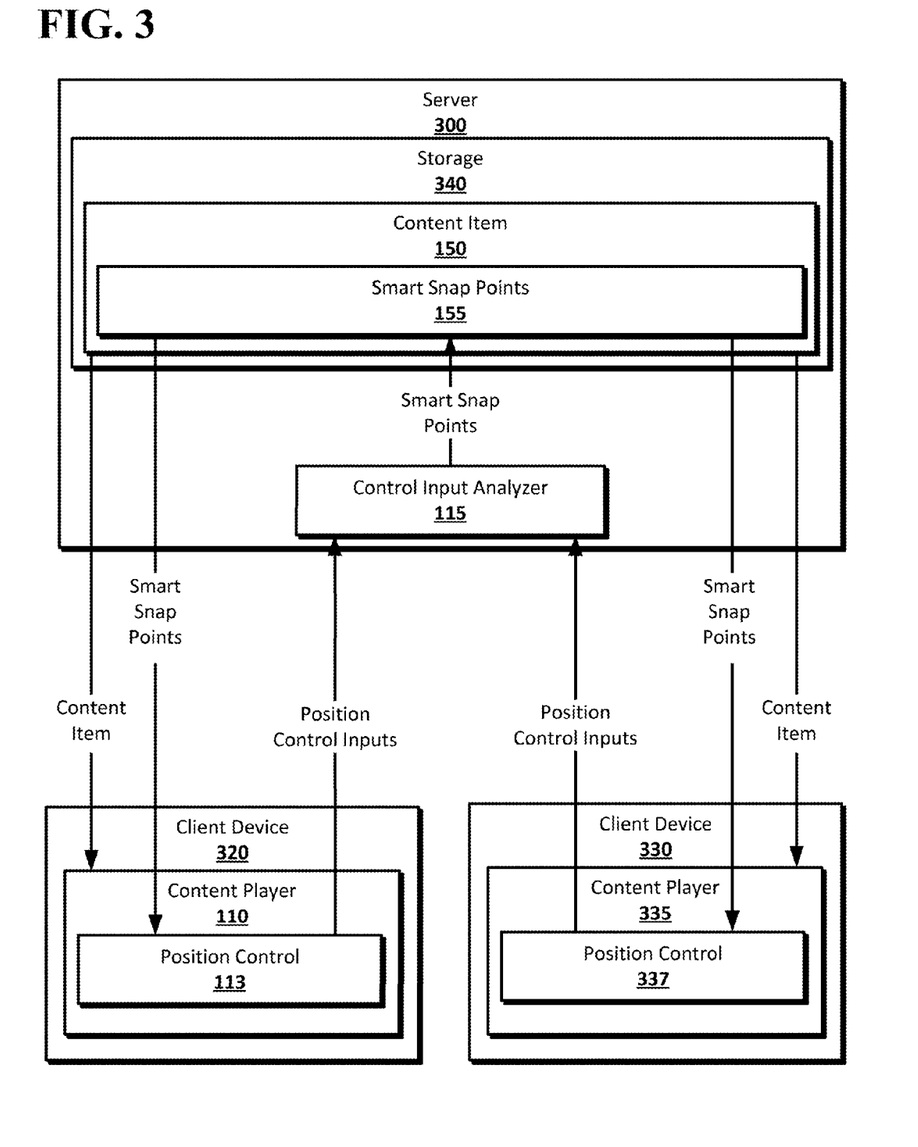
FIG. 3 shows an example arrangement for smart snap to interesting points in media content according to an implementation of the disclosed subject matter.
Figure 4A:
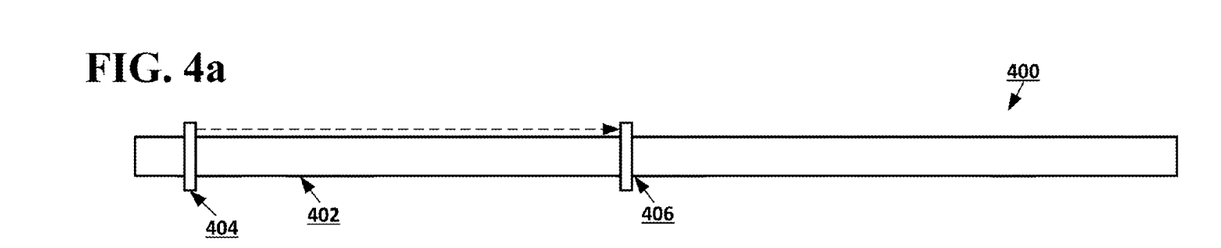
FIGS. 4a, 4b, 4c, and 4d show an example visualization of determining a smart snap point for smart snap to interesting points in media content according to an implementation of the disclosed subject matter.
Figure 4B:
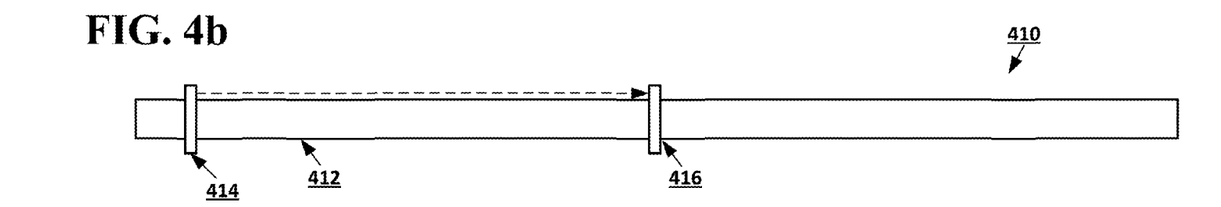
Figure 4C:
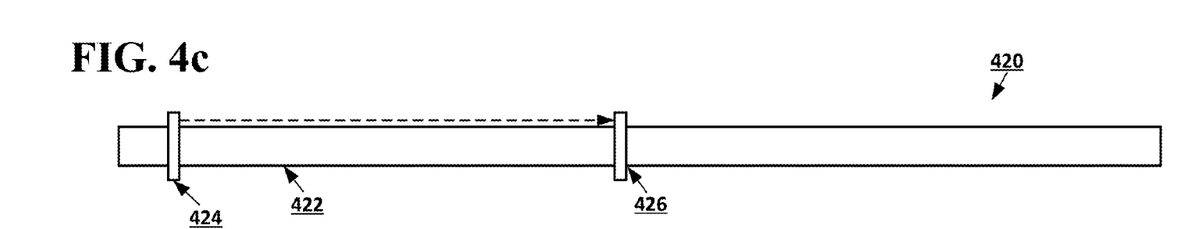
Figure 4D:
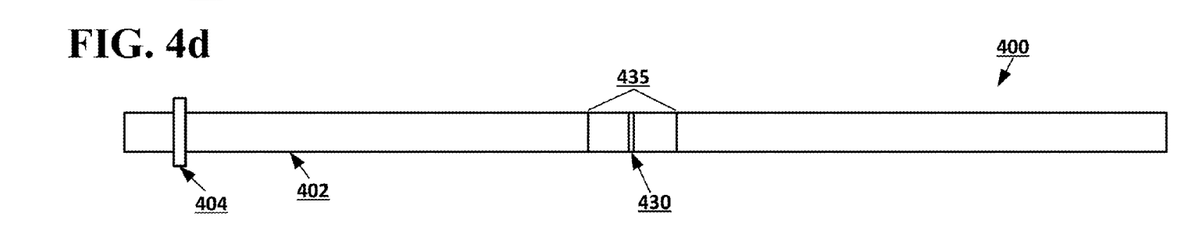

FIG. 3 shows an example arrangement for smart snap to interesting points in media content according to an implementation of the disclosed subject matter. In some implementations, the content item 150 may be stored remotely from the computing device running the content player 110, and may be accessible to multiple computing devices with separate users. The control input analyzer 115 may also be located remotely, and may, for example, be located on the same computing device as the content item 150. The control input analyzer 115 may receive position control inputs from multiple computing devices, and may analyze the position control inputs to determine the smart snap points 155 for the content item 150. This may allow the smart snap points 155 to be determined by the aggregate of user interactions with the control interface used to playback or view the content item 150.

For example, the server 300 may be any suitable computing device for running a server accessible to multiple users through a network such as the Internet. The server 300 may include storage 340, which may store the content item 150 including the smart snap points 155. The server 300 may be, for example, a server that hosts a streaming video service where users may view videos uploaded to the server 300. The control input analyzer 115 may also run on the server 300.

The client devices 320 and 330 may be computing devices similar to the computing device 100, such as, for example, tablets, smartphones, laptops, or any other suitable computing device for viewing or playing back the content item 150. The content players 110 and 335 may both be able to access the content item 150 on the server 300 to allow play back or viewing of the content item 150 on the client devices 320 and 330. Each of the client devices 320 and 330 may receive the smart snap points 155 for the content item 150. The client devices 320 and 330 may receive all of the smart snap points 155 and may use device appropriate smart snap points, or may receive smart snap points from the smart snap points 155 selected based on the type of client device the smart snap points 155 are being sent to. For example, the client device 320 may be smartphone, and the client device 330 may be a laptop. The client device 320 may receive, or use, more of the smart snap points 155 than the client device 330, due to the client device 330 having a larger screen and more accurate control interface. The position control 337 may be similar to the position control 113, may allow the user of the client device 330 to navigate the content item 150 received from the server 300 using position control inputs to the control interface, and may use the smart snap points 155 to move the playback or viewing position of the content item 150 when the user places a position indicator in a smart snap area for one of the smart snap points 155.

The control input analyzer 115 on the server 300 may receive the position control inputs from both the content player 110 on the client device 320 and the content player 335 on the client device 330. The position control inputs from both client devices 320 and 330 may be analyzed to create or modify smart snap points in the smart snap points 155 for the content item 150. For example, the content item 150 may be a video. The user of the client device 320 may use the content player 110 to view the video, for example, streaming the content item 150 from the server 300. The user may use the position control 113 of the content player 110 to skip to two minutes and 58 seconds into the video. The position control inputs received by the position control 113 on the client device 320 may be sent to the control input analyzer 115 on the server 300. The user of the client device 330 may also view the video using the content player 335, and may use the position control 337 to skip to three minutes and two seconds into the video. The position control inputs received by the position control 337 may also be sent to the control input analyzer 115 on the server 300. The control input analyzer 115 may analyze all received position control inputs in any suitable manner to determine the smart snap points 155, creating new smart snap points or modifying existing ones. For example the control input analyzer 115 may receive the position control inputs from the client device 320 first, and may use the position control inputs to create a smart snap point for the content item 150 at two minutes 58 seconds and a smart snap area from two minutes 48 seconds to three minutes 8 seconds. The control input analyzer 115 may then receive the position control inputs from the client device 330. The control input analyzer may determine that the smart snap point created for the content item 150 at two minutes 58 seconds should be moved, for example, to three minutes, at the average of the times where the users of the client devices 320 and 330 attempted to resume playback of the content item 150. Any other suitable technique may be used by the content analyzer 115 to create and modify the smart snap points 155 when position control inputs are received from multiple users.

FIGS. 4*a*, 4*b*, 4*c*, and 4*d* show an example visualization of determining a smart snap point for smart snap to interesting points in media content according to an implementation of the disclosed subject matter. A position control element 400 may include functional and visual elements of a position control such as the position control 113. For example, the visual elements of the position control element 400 may be displayed on the screen of the computing device 100 when the content player 110 is used to view or play back the content item 150. The position control element 400 may include any suitable elements for allowing a user to control the play back of the content item For example, the position control element 400 may include a position control bar 402 and position indicator 404. The position control bar 402 may be, for example, a scrub bar for a video or audio track, or a scroll bar for a web page or e-book, or the entirety of the display of a web page or e-book, and points along the length of the position control bar 402 may correspond to spatial or temporal points within the content item 150 being played back or viewed. The position indicator 404 may provide a visual indication of the spatial or temporal point in the content item 150 that is currently being played back or viewed. For example, while a video is played on the content player 110, the position indicator 404 may track the current time within the video, and a visual element for the position indicator 404 may move from left to right across the position control bar 402 corresponding to the playback of the video. The position control bar 402 and the position indicator 404 may also be hidden, not having visible visual elements. The position indicator 404 may be represented by the part of the content item 150 currently being played back or viewed. For example, when a web page is displayed on a smartphone, there may be no visible scroll bar or visible position indicator 404. The position of the position indicator 404 may be represented by the portion of the web page that is currently displayed. The position indicator 404 may be tracked by the position control of the web browser but not displayed to the user with a separate visual element.

A user may use the position indicator 404 of the position control element 400 to navigate to a different section of the content item 150. For example, the user may move the position indicator 404 from near the beginning of the position control bar 402 to the point 406. This may cause the content player 110 to play or show the part of the content item 150 that corresponds to the point 406 on the position control bar 402. For example, the position control bar 402 may be a scrub bar for viewing a video, which may be the content item 150. A user, for example, of the computing device 100, may use the scrub bar to skip to the two minute 57 second mark of the video by moving the position indicator 404 to the point 406. The position control inputs from the user may be sent to the control input analyzer 115, which may be on the computing device 100, or may be remote, for example, on the server 300.

Position control element 410 and 420 may include visual elements for position controls for computing devices separate from the computing device 100. For example, the position control element 410 may include visual elements for the position control 337 for the content player 335 on the client device 330, and the position control element 420 may include visual elements for the position control of an additional client device. A user may use the position control element 410 to navigate to a point in the content item 150. For example, a user of the client device 320 may use the position control element 410 to skip the three minute two second mark of a video, which may be the content item 150. The user may move the position indicator 414 to the point 416 on the position control bar 412. A user may use the position control element 420 to skip to the two minute 59 second mark of the same video, the content item 150. The user may move the position indicator 424 to the point 426 on the position control bar 422. The control inputs from both the position control elements 410 and 420 may be sent to the control input analyzer 115, which may be on the server 300.

The control input analyzer 115 on the server 300 may receive position control inputs from multiple position controls, for example, from the position control 113, the position control 337, and the position control that includes the position control element 420. The position control inputs may have been received while each of the content players was playing back or displaying the same content item, for example, the content item 150. The control input analyzer 115 may analyze the position control inputs to determine a smart snap point for the content item 150. For example, the control input analyzer 115 may determine that a smart snap point 430 should be created at the three minute mark of the video based on the position control inputs showing that users skipped to the point 406 at two minutes 57 seconds, the point 416 at three minutes 2 seconds, and the point 426 at two minutes 59 seconds. The smart snap area 435 may also be established for the smart snap point 430. The smart snap point 430 may be stored with the smart snap points 155 for the content item 150. The next time the content player 110 is used to play back or view the content item 150, the smart snap point 430 may be sent to the content player 110 along with the content item 150. The smart snap point 430 and smart snap area 435 may be displayed visually on the position control bar 402, or one or both may be hidden.

Figure 5A:
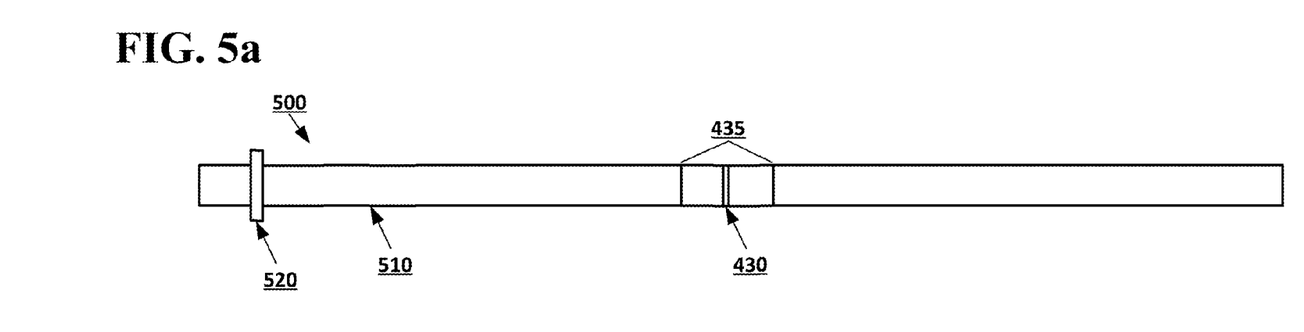
FIGS. 5a, 5b, and 5c show an example visualization of snapping to a smart snap point for smart snap to interesting points in media content according to an implementation of the disclosed subject matter.
Figure 5B:
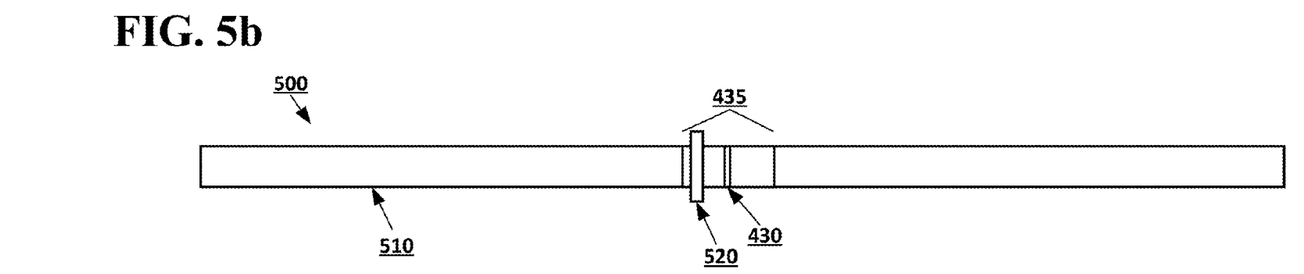
Figure 5C:
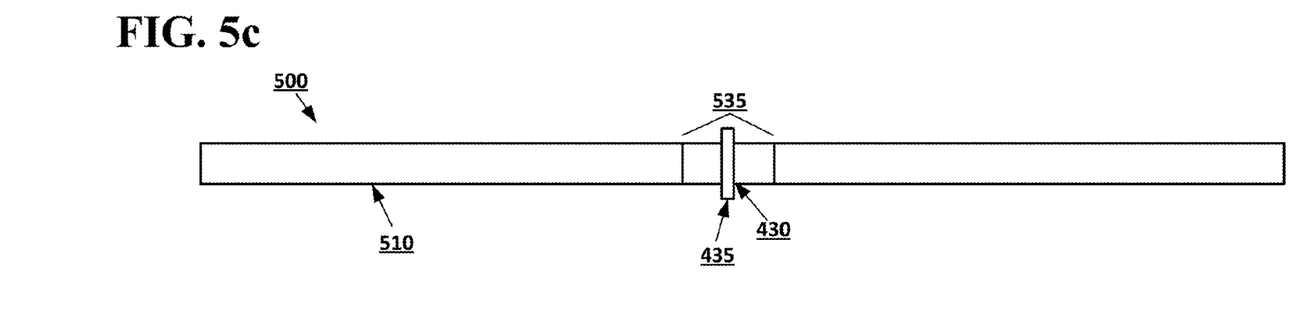

FIGS. 5*a*, 5*b*, and 5*c* show an example visualization of snapping to a smart snap point for smart snap to interesting points in media content according to an implementation of the disclosed subject matter. A user may use a content player, such as the content players 110 and 335, to playback or view the content item 150 on a computing device, such as the computing device 100. The content item 150 may include the smart snap points 155, among which may be the smart snap point 430. The position control element 500 may be displayed to the user to allow the user to control the playback or viewing position of the content item 150. For example, the content item 150 may be the video for which the content analyzer 115 created the smart snap point 430 at the three minute mark of the video. The smart snap point 430 and included smart snap area 435 may be displayed visually on the position control bar 510, or may be hidden.

The position indicator 520 may be used by the user to navigate to a different part of the content item 150. For example, the user may move the position indicator 520 along the position control bar 510 to skip several minutes of the video. The position control, for example, the position control 113, for the position control element 500 may detect that the user has moved the position indicator 520 into the smart snap area 435. The position control may then automatically move the position indicator 520 to the smart snap point 430, and playback or viewing of the content item 150 may resume from the smart snap point 430 instead of from the point to which the user had move the position indicator 520.

For example, the user may move the position indicator 520 to a point on the position control bar 510 corresponding to the two minute 57 second mark of the video. The smart snap area 435 may extend from the two minute 50 second mark to the three minute 10 second mark. Because the user moved the position indicator 520 into the smart snap area 435, the position control may determine that the position indicator 520 should be moved, or snapped, to the smart snap point 430 at the three minute mark, and the video may then resume playing from the three minute mark. The three minute mark of the video may be at the beginning of an interesting section of the video, as the smart snap point 430 may have been created based on multiple users skipping to near the three minute mark when viewing the video.

Figure 6:
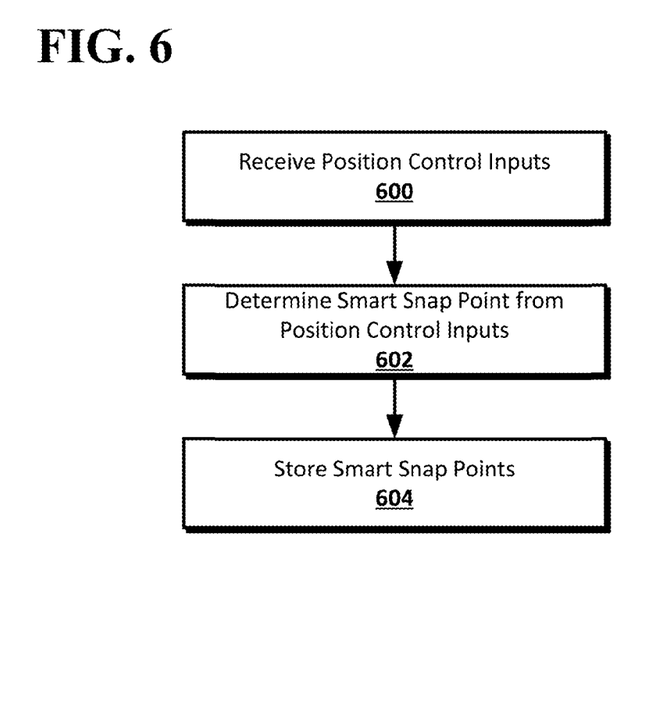
FIG. 6 shows an example of a process for determining smart snap points for smart snap to interesting points in media content according to an implementation of the disclosed subject matter.

FIG. 6 shows an example of a process for determining smart snap points for smart snap to interesting points in media content according to an implementation of the disclosed subject matter. At 600, position control inputs may be received. For example, the control input analyzer 115 may be run on the computing device 100 with or as part of the content player 110, and may receive position control inputs received by the position control 113 from a user of the computing device 100 locally. The control input analyzer may 115 may also run remotely from the content player 110, for example, on the server 300, and may receive position control inputs received by the position controls 113 and 337 from users of the client devices 320 and 330 remotely. The position control inputs may be input by users when using content players, such as the content players 110 and 335, to playback or view the content item 150.

At 602, smart snap points may be determined from the position control inputs. For example, the control input analyzer 115 may analyze, in any suitable manner, the position control inputs received from local or remote position control inputs to determine whether to create or modify smart snap points in the smart snap points 155 for the content item 150. The control input analyzer 115 may have received position control inputs locally, from the position control 113. The position control inputs may show that the user used the control interface to skip to the two minute 58 second mark of the content item 150. The control input analyzer 115 may create a smart snap point in the smart snap points 155 at the two minute 58 second mark of the content item 150 if no nearby smart snap point exists. The control input analyzer 115 may modify a smart snap point that has already been set near the two minute 58 second mark, for example, moving a smart snap point at the three minute two second mark to the three minute mark. The control input analyzer may have received the position control inputs remotely, for example, from multiple users, and may aggregate the multiple position control inputs in any suitable manner to determine whether to create or modify the smart snap points 155 for the content item 150. For example, if the multiple position control inputs are received serially, the control input analyzer may use determine the smart snap points 155 serially, creating or modifying the smart snap points 155 based on each newly received position control input as the position control input is received. The control input analyzer 115 may also wait to determine the smart snap points 155 for the content item 150 until a number of position control inputs have been received, and may analyze the number of received position control inputs at once to determine the smart snap points 155.

At 604, the smart snap points may be stored. For example, the content analyzer 115 may store any created or modified smart snap points for the content item 150 in the smart snap points 155. The smart snap points 155 may be stored within the same file as the content item 150, or may be stored separately and linked to the content item 150.

Figure 7:
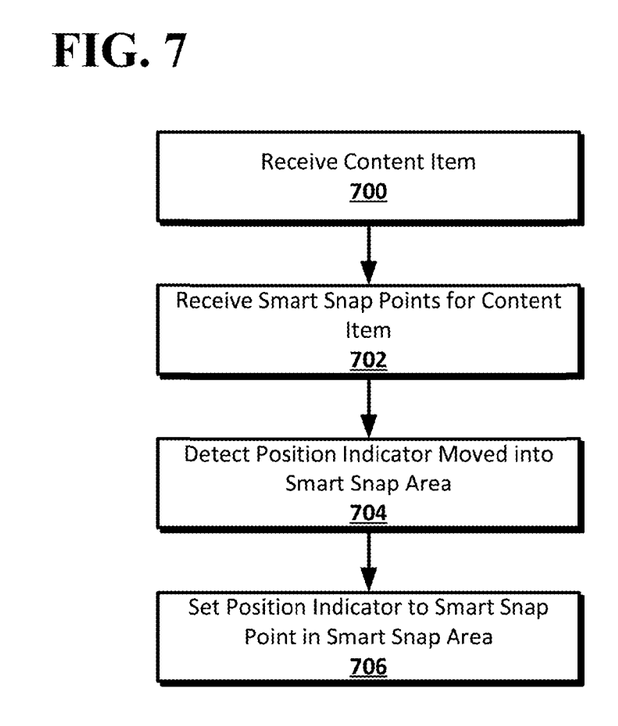
FIG. 7 shows an example of a process for snapping to snapping to a smart snap point for smart snap to interesting points in media content according to an implementation of the disclosed subject matter.

FIG. 7 shows an example of a process for snapping to snapping to a smart snap point for smart snap to interesting points in media content according to an implementation of the disclosed subject matter. At 700, a content item may be received. For example, the content player 110 may receive the content item 150 from the storage 140 of the computing device 100 or from the storage 340 of the server 300. The user may use the content player 110 to select the content item 150, which may be stored locally or remotely, in order to initiate playback or viewing of the content item 150 on the computing device 100. The content item 150 may be played back from local storage, for example, the storage 140, or received or streamed from remote storage such as the storage 340.

At 702, smart snap points for the content item may be received. For example, the smart snap points 155 for the content item 150 may be received by the content player 110 on the computing device 100 with the content item 150. The smart snap points 155 may be metadata in the same file as the content item 150, and may be received as part of the same file or data stream, or may be received as a separate file or data stream. For example, if the content item 150 is streamed from the storage 340 on the server 300, the smart snap points 155 may be included with the stream of the content item 150, or as a separate stream sent in conjunction with the content item 150.

At 704, the position indicator may be detected as being moved into a smart snap area. For example, a user of the computing device 100 may use the position control 113, including, for example, position control element 500, to move the position indicator 520 into the smart snap area 435 on the position control bar 510. The position control 113 may detect that the position indicator 520 has been moved into the smart snap area 435 by, for example, comparing the position in the content item 150 that corresponds to the point on the position control bar 510 where the user moved the position indicator 520 to the area encompassed by the smart snap area 435. For example, the position control 113 may compare the time in the video to which the position indicator 520 has been moved to the times included in the smart snap area 435, or the line number in an e-book to the line numbers included in the smart snap area 435.

At 706, the position indicator may be set to the smart snap point in the smart snap area. For example, the position control 113 may have detected that the position indicator 520 was moved into the smart snap area 435. The position control 113 may move the position indicator 520 to the smart snap point 430. The content player 110 may the resume playback or viewing of the content item 150 from the smart snap point 430. The position indicator 520 may not be moved to the smart snap point 430 if, for example, the position indicator 520 was moved within the smart snap area 435, instead of from outside the smart snap area 435 to inside the smart snap area 435.

Figure 8:
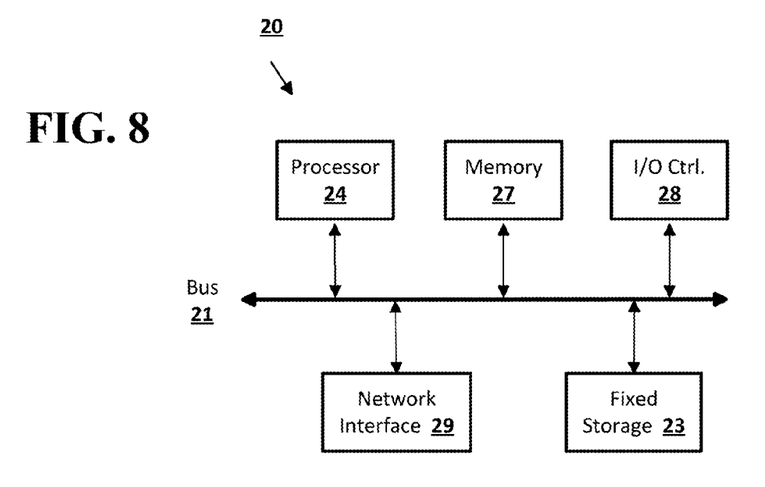
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
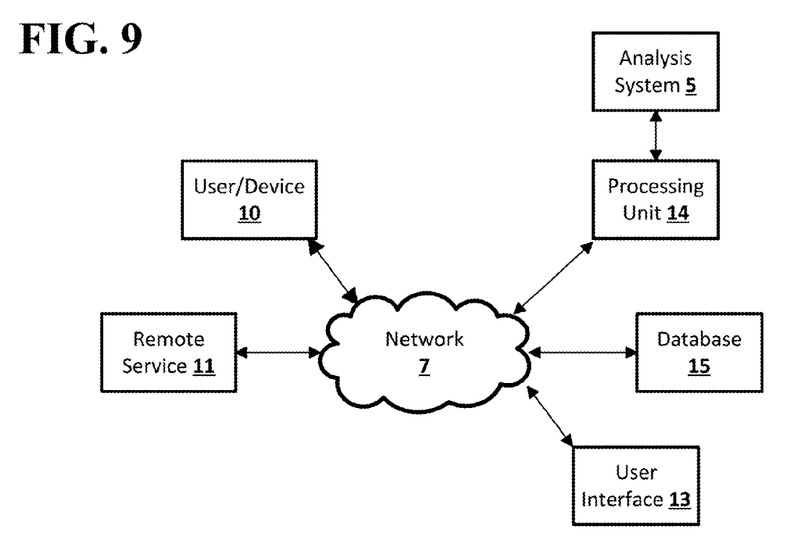
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, at a control input analyzer of a computing device, a first position control input, wherein the first position control input is a first input from a user to a control interface of a content player being used with a content item on the computing device;
   using the content item with the content player from a first position indicated by the first position control input;
   receiving, at the control input analyzer, a second position control input, wherein the second position control input is a second input from the user to the control interface of the content player being used with the content item;
   using the content item with the content player from a second positon indicated by the second position control input, wherein the first position is different from the second position;
   determining, by the control input analyzer, a smart snap point for the content item based on analyzing at least on the received first position control input and the received second position control input, wherein the smart snap point comprises an indication of location in the content item;
   determining an associated smart snap area for the smart snap point based at least on both the received first position control input and the received second position control input, wherein the associated smart snap area is smaller than the length of the content item and includes an area before and after the smart snap point that the position indicator of the content player is movable to;
   storing the smart snap point and the associated smart snap area;
   receiving, at the control input analyzer, a third position control input to the control interface from a user of the content player being used with the content item;
   determining, by the control input analyzer, that the third position control input moves a position indicator into the associated smart snap area for the smart snap point;
   automatically moving the position indicator to the smart snap point; and using the content item with the content player from the smart snap point, wherein the content item is one of a video, audio track, web page, or an e-book.

2. The computer-implemented method of claim 1, wherein the first position control input is received from a remote computing device.

3. The computer-implemented method of claim 1, wherein the first position control input comprises movement of a position indicator on a scrub bar.

4. The computer-implemented method of claim 1, wherein the first position control input comprises scrolling of a display of the content item.

5. The computer-implemented method of claim 1, wherein determining the smart snap point comprises creating a new smart snap point for the content item or modifying an existing smart snap point for the content item.

6. The computer-implemented method of claim 1, wherein storing the smart snap point and associated smart snap area comprises storing the smart snap point and associated smart snap area with the content item or storing the smart snap point and associated smart snap area separately from the content item and linked to the content item.

7. The computer-implemented method of claim 1 further comprising displaying at least one of the smart snap point and the associated smart snap area visually using the content player.

8. The computer-implemented method of claim 1, wherein the content item comprises a video, an audio track, a web page, or an e-book.

9. The computer-implemented method of claim 1, wherein the smart snap point comprises a time mark in the content item.

10. A computer-implemented method performed by a data processing apparatus, the method comprising:
receiving, at a control input analyzer of one or more servers, a plurality of position control inputs received from at least one user for a content item from a plurality of computing devices, each of the plurality of computing devices comprising a content player using the content item, each of the position control inputs being a control input to a user interface of the content player using the content item on each of the plurality computing devices, the control input indicating a position in the content item at which the content player uses the content item on a one of plurality of computing devices from which the position control input was received in response to receiving the position control input;
determining, by the control input analyzer, a smart snap point and an associated smart snap area for the content item based on the received plurality of position control inputs for the content item, wherein the determining of the smart snap point is based on at least two of the received plurality of position control inputs, and wherein two of the at least two of the received plurality of position control inputs indicated different positions in the content item, wherein the smart snap point comprises an indication of location in the content item and the associated smart snap area is smaller than the length of the content item and includes an area before and after the smart snap point that the position indicator of the content player is movable to;
storing, on the one or more servers, the at least one smart snap point and the associated smart snap area;
sending, from the one or more servers, the content item to a computing device, wherein the computing device is one of the plurality of computing devices or is an additional computing device, wherein the content item is one of a video, audio track, web page, or an e-book;
sending, from the one or more servers, the smart snap point and associated smart snap area to the computing device concurrently with the sending of the content item, wherein a position indicator is automatically moved to the smart snap point when the position indicator is moved into the associated smart snap area for the smart snap point by a user on a control interface of a content player on the computing device, and wherein the content item is used from the smart snap point by the content player.

11. The computer-implemented method of claim 9, wherein determining the at least one smart snap point and associated smart snap area comprises analyzing the plurality of position control inputs using at least one of a machine learning system and statistical analysis.

12. The computer-implemented method of claim 9, further comprising selecting which of the at least one smart snap points and associated smart areas to send to the computing device based on at least one characteristic of the computing device.

13. The computer-implemented method of claim 9, wherein sending the content to the computing device comprises streaming the content item to a content player of the computing device.

14. A computer-implemented method performed by a data processing apparatus, the method comprising:
receiving a content item for use with a content player, wherein the content item is one of a video, audio track, web page, or an e-book;
receiving a smart snap point and an associated smart snap area for the content item wherein the smart snap point comprises an indication of location in the content item and the associated smart snap area is smaller than the length of the content item and includes an area before and after the smart snap point that the position indicator of the content player is movable to, wherein the smart snap point and the associated smart snap area are determined from a plurality of previous position control inputs provided by at least one user to one or more control interfaces of one or more content players using the content item, wherein a previous control input indicates a position in the content item at which at least one of the content players uses the content item;
using the content item with the content player;
receiving a position control input from a user to a control interface of the content player;
determining that the position control input moves a position indicator into the associated smart snap area for the content item to the position associated with the probability;
determining a position from which to use the content item based on the probability, wherein the position from which to use the content item is determined to be either the position indicated by the smart snap point or the position associated with the probability;
using the content item at the determined position, and wherein the smart snap area is a heat map including a plurality of probabilities associated with different points within the smart snap area such that the indicator is automatically moved to the smart snap point to use the content item from the smart snap point when the probability indicates such and wherein the content item is instead used from a position indicated by the position control input when the probability indicates such.

15. The computer-implemented method of claim 14, wherein using the content item at the position indicated by the smart snap point comprises resuming playback of the content item at the smart snap point.

16. The computer-implemented method of claim 14, wherein using the content item at the position indicated by the smart snap point comprises displaying content of the content item that is located at the smart snap point.

17. The computer-implemented method of claim 14, wherein the position control input comprises movement of a visual element for the position indicator on a position control bar.

18. The computer-implemented method of claim 14, wherein the position control input comprises scrolling of a display of the content item and wherein the position indicator does not have a visual element.

19. The computer-implemented method of claim 14, further comprising suggesting an edit point for the content item to a user based on the smart snap point.

20. A computer-implemented system for smart snap comprising:
a storage comprising a content item and a smart snap point and associated smart snap area for the content item, wherein the content item is one of a video, audio track, web page, or an e-book;
a control input analyzer adapted to receive at least two position control inputs from at least one user of a content player using the content item, at least two of the at least two position control inputs indicating different positions the content player uses the content item from; determine the at least one smart snap point and associated smart snap area for the content item based on at least two of the at least two received position control inputs, and store the smart snap point and associated snap area in the storage with the content item; and
a content player comprising a position control, the content player adapted to use the content item, the position control adapted to receive position control inputs from a user of the content player through a control interface and send the position control inputs to the control input analyzer, use the content item from the positions indicated by the positons control inputs, receive the at least one smart snap point and associated smart snap area, determine that a received position control input from the user moves a position indicator into the smart snap area, and automatically move the position indicator to the smart snap point, and user the content item from the smart snap point wherein the smart snap point comprises an indication of location in the content item and the associated smart snap area is smaller than the length of the content item and includes an area before and after the smart snap point that the position indicator of the content player is movable to.

21. The computer-implemented system of claim 20 wherein the content item and the at least one smart snap point and associated smart snap area are sent to a remote computing device.

22. The computer-implemented system of claim 20, wherein the control input analyzer is further adapted to receive a plurality of position control inputs from a plurality of computing devices with a plurality of content players using the content item.

23. The computer-implemented system of claim 20, wherein the control input analyzer is further adapted to use machine learning systems or statistical analysis to determine the smart snap point and associated smart snap area.

24. A system comprising: one or more computers and one or more storage devices storing instructions which are operable, when executed by the one or more computers, to cause the one or more computers to perform operations comprising:
receiving, at a control input analyzer of a computing device, a first position control input, wherein the first position control input is a first input from a user to a control interface of a content player being used with a content item on the computing device and wherein a position control input indicates a position from which the content item is used;
using the content item with the content player from a first position indicated by the first position control input;
receiving, at the control input analyzer, a second position control input, wherein the second position control input is a second input from the user to the control interface of the content player being used with the content item;
using the content item with the content player from a second positon indicated by the second position control input, wherein the first position is different from the second position;
determining, by the control input analyzer, a smart snap point for the content item based on analyzing at least on the received first position control input and the received second position control input, wherein the smart snap point comprises an indication of location in the content item;
determining an associated smart snap area for the smart snap point based at least on both the received first position control input and the received second position control input, wherein the associated smart snap area is smaller than the length of the content item and includes an area before and after the smart snap point that the position indicator of the content player is movable to;
storing the smart snap point and the associated smart snap area;
receiving, at the control input analyzer, a third position control input to the control interface from a user of the content player being used with the content item;
determining, by the control input analyzer, that the third position control input moves a position indicator into the associated smart snap area for the smart snap point;
automatically moving the position indicator to the smart snap point; and
using the content item with the content player from the smart snap point, wherein the content item is one of a video, audio track, web page, or an e-book.

* * * * *